United States Patent Office 3,260,854
Patented July 12, 1966

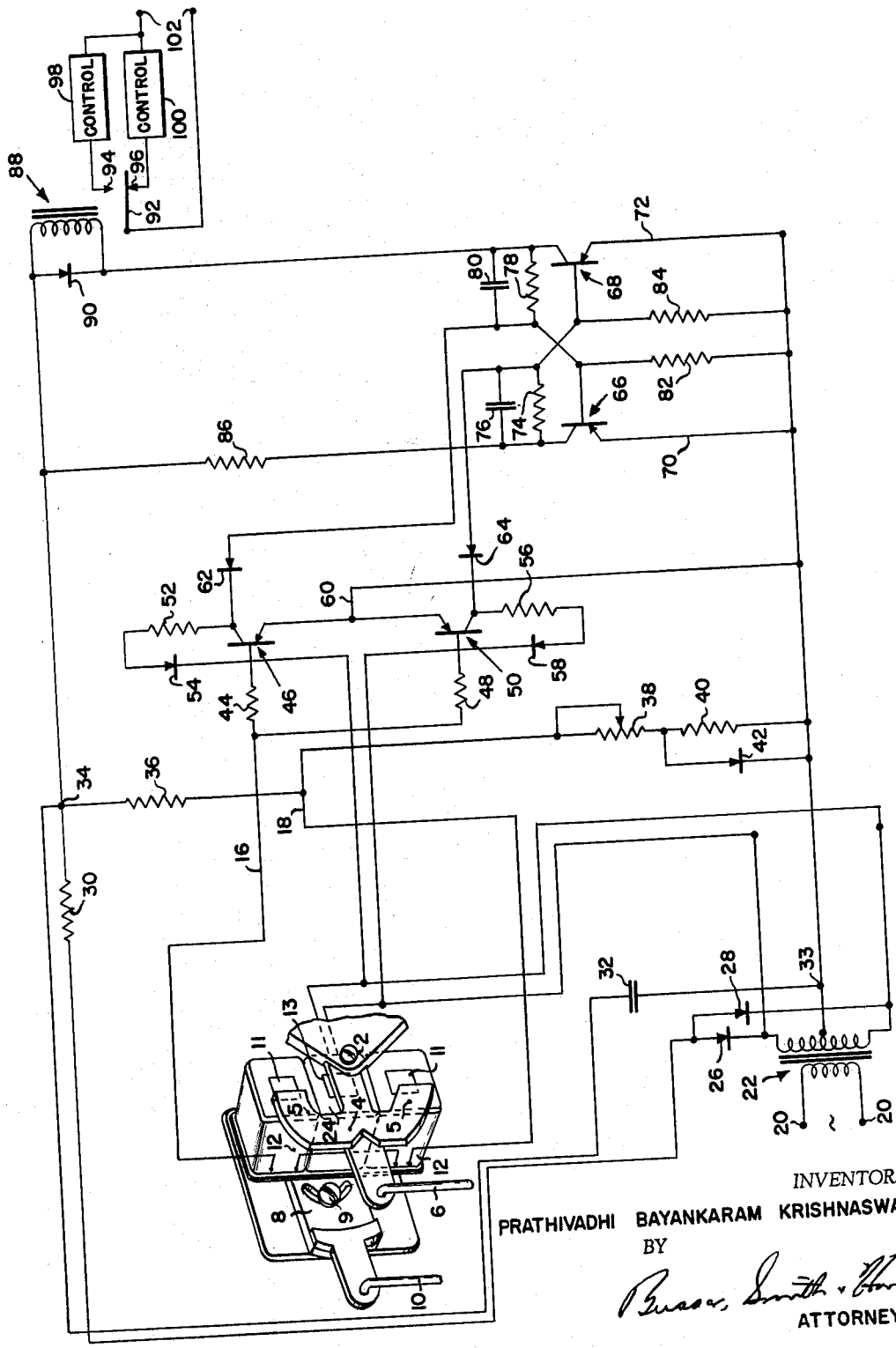

3,260,854
CIRCUITRY FOR EFFECTING VARIABLE RANGE CONTROL
Prathivadhi Bayankaram Krishnaswamy, Hatboro, Pa., assignor to Fischer & Porter Company, Warminster, Pa., a corporation of Pennsylvania
Filed Aug. 11, 1961, Ser. No. 130,972
3 Claims. (Cl. 307—88.5)

This invention relates to control apparatus particularly of the type having a "hysteresis" action in effecting one control action when a measured variable exceeds a particular value and another control action when the value of the variable drops below another predetermined value differing from the first. A simple example of such operation is often afforded in heating systems. When a temperature drops below a predetermined minimum value, a heater may be turned on, and is then caused to remain on until the temperature rises above another higher predetermined value. As the temperature drops the heating action is then interrupted until the temperature again drops below the minimum value. In some instances this action merely provides a dead zone preventing rapid hunting. In other cases, however, there may be multiple controls effected, as, for example, in the case of control of an exothermic reaction. Here, a heater may be initially turned on until some temperature is reached at which the reaction begins. Then as the reaction proceeds, with the heater turned off, the temperature may rise to some maximum temperature limit at which a cooling action must be initiated to keep the reaction under control. Under this cooling action the temperature may then drop to the lower temperature limit at which the reaction might cease to continue at a desired rate, at which limit the heating action may be resumed. Thus there may well be involved the control of multiple devices at the ends of a dead band.

The invention is particularly adapted for use in conjunction with measuring apparatus which, in itself, is not normally provided to effect the hysteresis type of control. Warning or signalling devices may also be controlled by the apparatus constituting the invention to give indications of the regime of operation at any time involved, calling for supervision in the event that the controlled process gets out of its normal limits.

Desirably such a device associated with a measuring instrument should be adapted to adjustment as to both end points of measurement at which controls should be effected. Stated in another way, this means that adjustments of a dead band should be susceptible to range adjustment while at the same time the band should be adjustable as to its position in the full range of measurement. As will be evident, the dual adjustments for band width and band location serve to provide for arbitrary adjustment of the dead band end points, within the range of the apparatus.

The general object of the invention is the provision of apparatus of the type just indicated. A further object is to provide an apparatus which, though alternating current operated, and though involving pulsing action, will provide for stable operation of a relay. Further objects of the invention are concerned with the production of an apparatus of this type which has high temperature stability and high insensitivity to line voltage variations so that, despite the disturbing factors, settings once made effect the desired controls reliably.

These and other objects of the invention particularly relating to details of construction and operation will become apparent from the following description, read in conjunction with the accompanying drawing, in which the figure shows in diagrammatic form the associated mechanical and electrical elements of a preferred embodiment of the invention.

A mounting frame provides a pivot 2 for a movable armature 4 having end extensions 5. A link 6 is provided to connect this armature to a movable element of a measuring or similar instrument so that during the measuring operation of the latter the armature is rocked about its pivot. The measuring instrument may be of any type, electrical, pneumatic, hydraulic, or the like, providing a motion transmitted through the link 6. Mounted on a pivot in the frame which is not shown but which is coaxial with the pivot 2 is a movable base 8 which may be clamped in adjusted position by a screw 9. For convenience of adjustment, this may be connected by a link 10 to a set point spindle or other adjustable element of the measuring instrument. As will be evident hereafter, this may be regarded as setting the position of a dead band with respect to the scale of measurement. The base 8 carries the E-shaped core of a differential transformer, the end legs 11 of which are adjacent the paths of movement of the ends 5 of the armature, while the central leg 13 is located adjacent to the pivot 2 and the portion of the armature thereat. Windings 12 on the outer legs of the transformer core are joined in series between the output leads 16 and 18. The coils are connected in the usual fashion so that, when symmetry of the core system including the armature 4 exists the induced signals in these coils are in opposition to provide a net zero output to the lines 16 and 18.

Input power supply terminals are indicated at 20 and receive current from the commercial alternating supply line. A transformer 22 provides a suitable voltage for operation, the voltage used depending upon the components hereafter described. The terminals of the secondary of the transformer 22 supply excitation to the winding 24 surrounding the central pole 13 of the differential transformer. Additionally the secondary of the transformer conveniently supplies a direct potential source for the remainder of the control system, full wave rectification being provided by the diodes 25 and 28, and filtering being supplied by the resistor 30 and capacitor 32 returning to the center tap 33 of the secondary which constitutes the reference "ground" for the system. A direct negative power supply terminal is thus provided at 34.

A voltage divider is provided by the series resistor 36, 38 and 40 returning to the terminal 33 from the negative terminal 34. The resistor 38 is adjustable and provides an adjustable bias for the bases of a pair of transistors 46 and 50. Shunting the resistor 40 is a diode 42 which, in conjunction with the resistor 40, provides temperature compensation to maintain operating settings despite large temperature variations. The junction of resistors 36 and 38 is connected to the line 18, while the line 16 is connected through the respective resistors 44 and 48 to the bases of the transistors 46 and 50.

The collector of transistor 46 is connected through resistor 52 and diode 54 to one terminal of the secondary of transformer 22, while the collector of transistor 50 is similarly connected through resistor 56 and diode 58 to the other terminal of the same secondary. The emitters of the transistors 48 and 50 are connected together and through line 60 to the terminal 33.

The collectors of the transistors 46 and 50 are respectively connected through the diodes 62 and 64 to the respective bases of transistors 66 and 68. The last transistors are connected to provide a bistable multivibrator and for this purpose have conventional criss-cross connections. The emitters are respectively connected at 70 and 72 to the reference terminal 33. The collector of transistor 66 is connected through the parallel arrangement of resistor 74 and capacitor 76 to the base of transistor 68; and the collector of the latter is similarly connected through the parallel arrangement of resistor 78 and capacitor 80 to the base of the former. These two RC arrangements which may have equal values of their components maintain the bilateral stability in conjunction with the equal resistors 82 and 84 connected to the respective bases and the resistor 86 and the impedance of the winding of a relay 88.

The relay 88 is desirably shunted by a diode 90 to provide smoothing of its action. The movable contact element 92 of the relay is illustrated as adapted to engage either of contact points 94 or 96 depending upon, respectively, energization or deenergization of the relay. The contacts 94 and 96 are illustrated as respectively connected to separate controls 98 and 100, power for operation of these controls being supplied from terminals 102. As will be evident the controlling actions of the relays may be quite arbitrary, and in the simplest arrangement the relay may merely effect either on or off actions. On the other hand, it may control multiple movable contacts with a wide variety of controlled connections.

The operation of what has been described is as follows:

Assuming a particular setting of the resistor 38, which controls the bias on the bases of both transistors 46 and 50, the transistors, in the absence of signals from the lines 16 and 18 will be in saturated condition and heavy currents will flow through resistors 52 and 56 whenever the respective half cycles applied to the collectors are negative. Positive pulses are, therefore, applied to the cathodes of the diodes 62 and 64 and are blocked thereby. When these pulses terminate, the cathodes of these diodes will, of course, become more negative, but due to the normal negative biasing of the bases of transistors 66 and 68, the diodes 62 and 64 still remain non-conducting. Positive half cycles are blocked from the collectors of the transistors 46 and 50 by the diodes 54 and 58. Thus, during the negative half cycles which might otherwise (as described below) effect a controlling action, negative control pulses are prevented from reaching the bistable multivibrator.

It will now be simpler to consider the operation of only one of the transistors, namely 46. The condition above described prevails until the movement of the armature of the differential transformer is such that an alternating output is provided at connection 16 sufficient to overcome in its positive excursions the bias provided by the adjustment at 38. Assume that such a positive excursion occurs when a negative half wave is introduced to the collector of transistor 46 through diode 54 and resistor 52. The positive signal at the base of transistor 46 will drive the transistor 46 out of saturation condition into an operating condition (or even to cut-off) in which the collector of this transistor presents, in effect, a high resistance. The negative signal (negative half wave) applied through diode 54 and resistor 52 is now no longer effectively short-circuited to the terminal 33, but is applied through diode 62 as a large negative signal to the base of transistor 66. Assuming, first, that this transistor was non-conducting, the transistor 68 being conductive, this signal will throw the bistable multivibrator to its alternative state in which transistor 66 conducts, with resulting deenergization of relay 88. On the other hand, if transistor 66 had been previously conducting, the negative pulse applied thereto would not change its state nor that of the multivibrator.

The last named action, of course, occurs only when the positive signal applied to the base of transistor 46 is sufficient in magnitude to overcome the normal negative bias applied by reason of the adjustment at 38. The magnitude of the positive signal depends upon the angular displacement of the armature 4 from its neutral position, and hence the described action occurs at a predetermined deviation, the adjustment at 38 being, accordingly, a range adjustment.

It will be noted, from the foregoing, that a phase-discriminating action is involved, the operation just described occurring only when a positive signal to the base of transistor 46 is concurrent with the production of a negative signal at its collector. If both of these signals are positive, while the base may be driven to cut off the transistor the signal appearing at its collector will be positive and blocked by the diode 62. On the other hand, if both signals are negative, the transistor is merely driven further toward its saturation operation and being highly conductive no signal is produced (or only an inoperative signal) through the diode 62. The operation with respect to the transistor 50 is the same as that described except that the phasing situation is reversed. It will be evident from the connections that the collector of transistor 50 receives its negative pulses when the pulses applied to the collector of transistor 46 are positive. Since the differential transformer is excited by the same alternating supply as supplies the collectors of the two transistors, it will be evident that the transistor 50 will be driven to a condition providing negative pulses through diode 64 only when the armature 4 is on the other side of the set point. When this occurs, to a sufficient extent to provide overcoming of the bias of the base of transistor 50 it will emit negative pulses through diode 64 which will drive the transistor 68 to a conductive condition and energize the relay 88. Here again successive operations will produce results only the first time and if the multivibrator was previously in the stable state in which transistor 68 was non-conducting.

In summary of the above, therefore, it may be said that the bistable multivibrator is driven to one of its states when the armature 4 is moved sufficiently in one direction from the set point and to the other of its states when the armature moves in the opposite direction to a sufficient extent from its set point. The result, therefore, is that the relay 88 will be energized with one directional deviation from the set point and deenergized only when the deviation is in the opposite direction beyond a predetermined range, the range being adjusted by adjustment of resistor 38. The reverse is also true. A hysteresis action thus results. Since the set point may be adjusted by movement of the arm 8 through link 10, the overall result is predeterminability of the values of the variable controlling link 6 at which the relay 88 is respectively energized or deenergized. It will be evident that the differential transformer supplying signals to the lines 16 and 18 may be replaced by various other devices which will give rise to alternating signals having phase variable relationship to the alternating signals applied to the collectors of the transistors 46 and 50 and indicative of end points of a dead band. Such devices, for example, may be bridges, photoelectric assemblies, or the like. Generally such devices involve a zero signal output for some measurement value with increasing outputs of opposite phases on either side thereof. Reversal of phase is significant because of the reference phase of the signal applied to each of the transistor collectors.

It may be noted that more elaborate control actions may be secured by connecting other pairs of transistors such as 46 and 50 to the input signal line corresponding to 16. In such case parallel bias feed may be provided to the different pairs of transistors with the use of blocking condensers to keep direct signals out of the lines 16 and 18 and the pickup coils of the differential transformer or equivalent connections of other devices. Using two pairs of transistors such as 46 and 50, and of the elements subsequent to them, actions may be afforded about a single set point such as may be typified by the control of an exothermic reaction. In such case, for example, considering successive temperatures $T_1$, $T_2$, $T_3$ and $T_4$ in increasing order, and starting with a low temperature, heating may take place to start a reaction until the temperature $T_2$ is reached. At this temperature the heating may be cut off. Then, as the temperature rises, due to the reaction, to the temperature $T_4$, a cooling action may be started. This cooling action, overcoming the exothermic production of heat may then continue until the temperature is lowered to $T_3$. If the temperature continues to drop, due to process lag, and reaches $T_1$, the heating operation may again start, being thereafter terminated if the temperature reaches $T_2$. Thus, the temperature may be maintained between the uppermost and lowermost limits while avoiding the wasteful application simultaneously of both heating and cooling. Obviously two relays, each associated with its bistable multivibrator and with a single pair of input transistors, may control such a more elaborate operation. The two systems may have independent band width control.

The mechanical part of the assembly as specifically shown is adapted as a standard device for association with various measuring instruments, but obviously may be built into a measuring instrument as an integral part thereof.

While it is preferred to use transistors such as 46 and 50 which are normally in a saturated condition during their operating cycles in the absence of an actuating signal, it will be evident that they might normally be biased to a cut-off condition to be driven into an operating amplifying condition by a signal of sufficient amplitude.

It will be evident that various changes in details of construction may be made without departing from the invention as defined in the following claims.

What is claimed is:

1. In combination, means providing an alternating variable amplitude and reversible phase input signal, a pair of amplifiers, means supplying to said respective amplifiers reference signals of opposite phases at the frequency of said input signal, each of said amplifiers receiving said input signal, means providing a direct bias to each of said amplifiers to drive them simultaneously to similar limit conditions of operation such that amplitude values of said input signal less than a predetermined value fail to produce a condition of said amplifier out of said limit condition while amplitude values of said input signal exceeding said predetermined value produce a condition of said amplifier out of said limit condition to provide an output therefrom varying with said input signal, and a bistable multivibrator receiving the outputs from both of said amplifiers and arranged to be tripped to one stable state by one of said outputs and to its other stable state by the other of said outputs.

2. In combination, means providing an alternating variable amplitude and reversible phase input signal, a pair of amplifiers, means supplying to said respective amplifiers reference signals of opposite phases at the frequency of said input signal, each of said amplifiers receiving said input signal, means providing a direct bias to each of said amplifiers to drive them simultaneously to similar limit conditions of operation such that amplitude values of said input signal on one side of a predetermined value fail to produce a condition of said amplifier out of said limit condition while amplitude values of said input signal on the other side of said predetermined value produce a condition of said amplifier out of said limit condition to provide an output therefrom varying with said input signal, and a bistable multivibrator receiving the outputs from both of said amplifiers and arranged to be tripped to one stable state by one of said outputs and to its other stable state by the other of said outputs.

3. In combination, means provided an alternating variable amplitude and reversible phase input signal, means receiving said input signal and providing one output signal only when said input signal has an amplitude value on one side of a first predetermined value and a predetermined phase and providing another output signal only when said input signal has an amplitude value on one side of a second predetermined value and a phase opposite said predetermined phase, and a bistable multivibrator receiving both of said outputs and arranged to be tripped to one stable state by one of said outputs and to its other stable state by the other of said outputs.

References Cited by the Examiner

UNITED STATES PATENTS

| | | | |
|---|---|---|---|
| 2,763,732 | 9/1956 | Rockwell | 330—100 |
| 2,874,315 | 2/1959 | Reichert | 307—88.5 X |
| 2,971,137 | 2/1961 | Stewart | 317—132 X |

ARTHUR GAUSS, *Primary Examiner.*

JOHN W. HUCKERT, *Examiner.*

M. LEE, J. JORDAN, *Assistant Examiners.*